United States Patent
Sopp

(10) Patent No.: US 7,952,243 B2
(45) Date of Patent: May 31, 2011

(54) DEVICE FOR COOLING AN ELECTRICAL MACHINE AND ELECTRICAL MACHINE HAVING SUCH A COOLING DEVICE

(75) Inventor: Helmut Sopp, Fladungen (DE)

(73) Assignee: Siemens Aktiengesellschaft, München (DE)

( * ) Notice: Subject to any disclaimer, the term of this patent is extended or adjusted under 35 U.S.C. 154(b) by 235 days.

(21) Appl. No.: 12/300,023

(22) PCT Filed: May 3, 2007

(86) PCT No.: PCT/EP2007/054295
§ 371 (c)(1),
(2), (4) Date: Nov. 7, 2008

(87) PCT Pub. No.: WO2007/131887
PCT Pub. Date: Nov. 22, 2007

(65) Prior Publication Data
US 2009/0108715 A1 Apr. 30, 2009

(30) Foreign Application Priority Data

May 11, 2006 (DE) .................. 10 2006 022 139

(51) Int. Cl.
*H02K 9/19* (2006.01)
(52) U.S. Cl. .................................... 310/64; 310/61
(58) Field of Classification Search ............ 310/60 A, 310/61, 54, 64
See application file for complete search history.

(56) References Cited

U.S. PATENT DOCUMENTS

| | | | | |
|---|---|---|---|---|
| 2,648,018 | A | * | 8/1953 | Meier ............................ 310/43 |
| 3,151,262 | A | * | 9/1964 | Howard et al. ............... 310/260 |
| 3,829,720 | A | * | 8/1974 | Swanke et al. ................ 310/43 |
| 7,102,267 | B2 | * | 9/2006 | Gromoll et al. ............... 310/260 |
| 7,154,201 | B2 | * | 12/2006 | Kuhn ............................. 310/58 |
| 2001/0031214 | A1 | * | 10/2001 | Haavik .......................... 418/85 |
| 2005/0194847 | A1 | * | 9/2005 | Gromoll et al. ............... 310/54 |

FOREIGN PATENT DOCUMENTS

| | | |
|---|---|---|
| DE | 102 44 428 A1 | 6/2004 |
| DE | 103 42 791 A1 | 4/2005 |
| FR | 2 859 836 A1 | 3/2005 |
| WO | WO 2004/030183 A1 | 4/2004 |

* cited by examiner

*Primary Examiner* — Quyen Leung
*Assistant Examiner* — Naishadh N Desai
(74) *Attorney, Agent, or Firm* — Henry M. Feiereisen; Ursula B. Day

(57) ABSTRACT

The invention relates to a device (1) for cooling an electrical machine, in particular an electric motor, the electrical machine having a stator (3) with a stator core (31) and a rotor (4) having a rotor core (41) resting on a rotor shaft (5). Coil windings with axially protruding winding heads (6) are introduced in the stator core (31). According to the invention, the device has at least one cap ring (7) which can be cooled and through which the rotor shaft (5) is guided, the cap ring (7) which can be cooled taking up at least part of an annular intermediate space (ZR) which is in the axial region (BW) of a protruding winding head (6) and the rotor shaft (5). The invention relates to an electrical machine, in particular an asynchronous or synchronous motor, having such a cooling device.

21 Claims, 5 Drawing Sheets

DEVICE FOR COOLING AN ELECTRICAL MACHINE AND ELECTRICAL MACHINE HAVING SUCH A COOLING DEVICE

BACKGROUND OF THE INVENTION

The invention relates to a device for cooling an electrical machine, in particular an electric motor, wherein the electrical machine has a stator with a stator core as well as a rotor with a rotor core which is seated on a rotor shaft. Coil windings with axially projecting end windings are incorporated in the stator core.

The invention also relates to an electrical machine, in particular to an electric motor with a cooling device such as this, in particular for cooling at least one end winding and/or the rotor shaft in the axial area of the at least one end winding.

Electrical machines, in particular electric motors such as asynchronous motors or synchronous motors, are required for a wide range of drive tasks, for example for driving machine tools. Electrical machines produce heat losses during operation, as a result of electrical losses such as eddy current or copper losses. Increased cooling of the electrical machine may be necessary if the heat losses that occur cannot simply be dissipated to the surrounding area via the outer surface of the electrical machine.

Electrical machines may be cooled by a gaseous or liquid medium. Air is preferably used as a gaseous medium, and water as a liquid medium. Electrical machines may be self-cooled or externally cooled.

In the case of self-ventilated machines, the electrical machine is typically cooled by an impeller wheel seated on a shaft end of the electrical machine. In the case of externally ventilated electrical machines, the cooling is provided by means of a separate fan, which produces a cooling air flow independently of the rotation speed of the electrical machine. In order to cool the electrical machine, the air can flow through the air gap between the stator and the rotor, through cooling air channels which run axially in the stator and/or rotor, or by means of a cooling jacket on the radial outer face of the electrical machine.

In the case of liquid cooling, the electrical machine is preferably cooled by means of a cooling jacket. This is necessary in particular for built-in motors or motor spindles with a relatively high power density. In the case of motors such as these, cooling via the outer surface in the installed state is possible only to a restricted extent.

Components or parts of the electrical machine which become particularly hot during operation, for example the end winding of a coil winding which is laid in the stator core, are coupled to the liquid-cooled cooling jacket with as low a thermal transfer resistance as possible. In the case of the end winding, this is done via a thermally conductive encapsulation compound. The end winding is embedded or encapsulated in the encapsulation compound. The thermally conductive encapsulation compound therefore rests over an area, and in particular flush, on the cooling jacket.

Nevertheless, even when using this cooling method, the hot spots in the motor interior, for example in the end winding and in the rotor shaft, are cooled only inadequately. This has the disadvantageous consequence that the electrical machine must be derated for relatively long-term operation, in order to avoid overheating.

SUMMARY OF THE INVENTION

One object of the invention is to specify a better device for cooling an electrical machine, in particular for cooling the end winding and/or the rotor shaft.

A further object of the invention is to specify a suitable electrical machine which has a cooling device such as this.

The object is achieved by a device for cooling an electrical machine which includes a stator with a stator core as well as a rotor with a rotor core which is seated on a rotor shaft, wherein a coil winding with axially projecting end windings is incorporated in the stator core, wherein the device has at least one coolable cap ring through which the rotor shaft is passed, wherein the coolable cap ring occupies at least a part of an annular intermediate space which is located in the axial area of a projecting end winding and of the rotor shaft.

According to the invention, the device has at least one coolable cap ring through which the rotor shaft is passed. The cap ring occupies at least a part of an annular intermediate space which is located in the axial area between a projecting end winding and the rotor shaft. The annular intermediate area is located in the radial direction between an outer face of the rotor shaft and a radial inner face of the end winding. "Radial" is a direction towards or away from the rotation axis.

The major advantage is that the heat losses which are produced in the end winding and in the rotor shaft as particular hot spots can be effectively dissipated through the coolable cap ring. The critical hot spots are effectively cooled at their point of origin.

The coolable cap ring is fitted in an annular intermediate space which does not contribute to the motor drive. The annular intermediate space is essentially rotationally symmetrical. This is associated with the further major advantage that the physical volume of the electrical machine can remain essentially unchanged.

A further advantage is that the cooling device according to the invention can be retrofitted to already existing self-cooled, surface-cooled or externally cooled standard or special motors.

According to one embodiment, the coolable cap ring has at least one, in particular annular, cavity for a gaseous or liquid coolant flowing through. The cavity results in advantageously uniform cooling performance along the radial circumference of the coolable cap ring, that is to say along the envelope surface of the cap ring. This results in the end winding and the rotor shaft being cooled more uniformly.

In particular, the coolable cap ring has coolant connections for a coolant inlet and outlet. By way of example, the electrical machine can be connected via the connections to a recooling system.

The coolable cap ring preferably has a minimum internal diameter which, in the axial area through which the rotor shaft passes, is slightly larger than the external diameter of the rotor shaft. The heat losses which are emitted from the surrounding rotor shaft can be effectively absorbed, via an air gap which remains between the coolable cap ring and the rotor shaft, by the radial inner face of the cap ring, and can be dissipated to the exterior via the cap ring.

In one embodiment, the cap ring has a radial outer surface which is geometrically matched to a radial inner surface of the end winding. The two surfaces rest on one another when the cap ring is in the installed state, in particular closely and without any clearance.

In particular, the coolable cap ring is firmly fitted to a machine housing or to the stator of the electrical machine.

According to a further embodiment, the coolable cap ring has two cap ring components which, when the coolable cap ring is assembled axially, form the at least one cavity for the coolant. The constructive cut through the coolable cap ring is preferably made at right angles to the axis of symmetry and axis of rotation of the coolable cap ring, to be precise axially at the position at which the cavity in the coolable cap ring has its largest cross-sectional area.

In one preferred embodiment, the device has at least one hollow-cylindrical cooling element which is firmly seated on the rotor shaft. The cooling element has a rotor shaft sleeve with first axially separated radial projections. The hollow-cylindrical cooling element surrounds at least a part of the annular intermediate space which is located in the axial area between the projecting end winding and the rotor shaft. Furthermore, the cap ring may have second radial projections which, in the installed state of the cap ring, engage without touching in the intermediate areas which are formed by the first radial projections.

The first radial projections have a very much larger surface than a purely cylindrical envelope surface. The first radial projections, which have the effect of increasing the surface area, result in the hollow-cylindrical cooling element acting like a heat sink. This advantageously allows a large proportion of the heat losses absorbed by the cooling element from the rotor shaft to be emitted as radiated heat to the coolable cap ring.

The second radial projections of the coolable cap ring preferably engage radially from the outside in the intermediate areas which are formed by the first radial projections. The interleaving of the first and second radial projections, without touching, means that the heat losses which are radiated from the large surface area of the hollow-cylindrical cooling element are absorbed by an internal surface, which is essentially of the same size, of the coolable cap ring. This further improves the cooling of the rotor shaft. To a certain extent, the cooling of the rotor shaft also results in cooling of the adjacent rotor core.

In particular, the first and second radial projections are geometrically matched to one another such that, when the coolable cap ring is in the installed state, they can engage in the respective intermediate areas between the first and second radial projections. It is possible to provide in the design for an air gap, in particular an approximately identical air gap, to be maintained during operation of the electrical machine. The air gap is preferably in the region of millimeters. This allows more uniform cooling of the rotor shaft.

In one particularly preferred embodiment, the first and second radial projections are in the form of ribs, in the sense of a cylindrical heat sink with radially circular cooling ribs. The geometry of heat sinks such as these is known from heat sinks for electronic components.

In particular, the cooling element is in the form of axially separated disk rings which are seated on the rotor shaft sleeve.

In one particularly advantageous embodiment, the coolable cap ring has two cap ring halves which surround the hollow-cylindrical cooling element when the coolable cap ring is assembled radially. After assembly, the first and second radial projections are interleaved both axially and in a circular form. In this embodiment, the heat is transferred from the hollow-cylindrical cooling element to the coolable cap ring particularly well.

Once the coolable cap ring has been assembled radially and the entire rotor has been inserted axially into the electrical machine, the cap ring coaxially surrounds the hollow-cylindrical cooling element. It is surrounded at least in an axial subarea in the intermediate space between the rotor shaft and the end winding.

In one further embodiment, the hollow-cylindrical cooling element has a first cross-sectional area in the axial area of a first radial projection with a central circular cutout. The cutout cross-sectional area essentially corresponds to the cross-sectional area of the rotor shaft in the axial area there. Furthermore, the coolable cap ring has a second cross-sectional area in the axial area of the second radial projections. The first and second cross-sectional areas are matched to one another such that the coolable cap ring can be pushed onto the hollow-cylindrical cooling element only at predetermined rotation angles with respect to one another. When viewed axially and at the predetermined rotation angles, these two surfaces have a cross-sectional area in the form of an annular disk, apart from the narrow air gap that is required.

According to a further embodiment, the hollow-cylindrical cooling element has a cruciform or polygonal cross-sectional shape with the central circular cutout. The coolable cap ring has a circular cross-sectional shape with a cruciform or polygonal cutout corresponding thereto.

The object of the invention is also achieved by an electrical machine which has a device according to the invention such as this for cooling, in particular for cooling at least one end winding and/or the rotor shaft in the axial area of the at least one end winding.

The major advantage of the electrical machine according to the invention is that this provides a considerably higher continuous power during operation, in the same physical volume.

According to one preferred embodiment, the cooling device has at least one coolable cap ring with a radial outer surface. The end winding is at least partially surrounded by an encapsulation compound. The encapsulation compound has a radial inner surface which is geometrically matched to the radial outer surface of the cap ring. It should be highly thermally conductive. When the cooling device and/or the coolable cap ring are/is in the installed state, the radial outer surface and the radial inner surface rest on one another, in particular closely and without any clearance.

A further embodiment results in the cooling device having at least one coolable cap ring with a radial outer surface. At least a part of the end winding is impregnated in a plastic. The plastic has a radial inner surface which is geometrically matched to the radial outer surface of the coolable cap ring. It should be highly thermally conductive. The radial outer surface and the radial inner surface rest on one another, in particular closely and without any clearance, when the cooling device and/or the coolable cap ring are/is in the installed state.

In particular, the radial outer surface of the coolable cap ring is preferably rotationally symmetrical—for example cylindrical or conical. The encapsulation compound or the plastic in which at least a part of the end winding is impregnated forms a rotationally symmetrical radial inner surface which is matched to the radial outer surface of the coolable cap ring.

This allows an advantageously particularly good thermally conductive transfer between the radial inner face of the end winding and the cooling cap ring. This greatly reduces the occurrence of local hot spots in the end winding.

In a further advantageous embodiment, the coolable cap ring has an at least partially circumferential cooling collar for cooling an axial end of the end winding and/or an end face of the end winding when the coolable cap ring is in the installed state.

This is associated with the further advantage that, in addition to the radial inner surface and the radial outer surface of the end winding, which is cooled by a cooling jacket, it is also possible to cool the axial outer surface and/or the axial end face of the end winding. This even further reduces the creation of possible hot spots in the end winding.

In a further embodiment, the at least partially circumferential cooling collar of the coolable cap ring has an axial cooling surface in the form of an annular disk. The encapsulation compound or the plastic in which at least a part of the end winding is impregnated has an axial outer surface in the form of an annular disk. The axial outer surface which is in the form of an annular disk is geometrically matched to the axial cooling surface, which is in the form of an annular disk, of the cooling collar. When the cooling device and/or the coolable cap ring are/is in the installed state, the axial surfaces which are in the form of annular disks rest on one another, in particular closely and without any clearance.

This advantageously allows an even better thermally conductive transfer between the axial outer face of the end winding and the cooling collar of the coolable cap ring.

According to a further embodiment, the rotor has a hollow-cylindrical cooling element with the first cross-sectional area in the axial area of a first radial projection with the central circular cutout. The circular cutout corresponds essentially to the cross-sectional area of the rotor shaft in the axial area there. The coolable cap ring has the second cross-sectional area in the axial area of the second radial projections. The first and second cross-sectional areas are matched to one another such that the rotor can be fitted with the hollow-cylindrical cooling element at the predetermined rotation angles axially by means of the coolable cap ring which has already been mounted in the electrical machine.

The particular advantage of this embodiment is that the entire rotor, with the hollow-cylindrical cooling element seated on the rotor shaft, can be mounted through a coolable cap ring which has already been installed in the machine housing. This allows the electrical machine to be completed, except for the end frame for axial fixing of the rotor shaft.

The electrical machine is, in particular, a liquid-cooled built-in motor or a liquid-cooled motor spindle.

In particular, according to the invention, the electrical machine is an asynchronous motor or a synchronous motor.

BRIEF DESCRIPTION OF THE DRAWING

Further advantageous characteristics of the invention will become evident from their explanation, by way of example, with reference to the FIGS., in which.

DETAILED DESCRIPTION OF PREFERRED EMBODIMENTS

Figure 1:
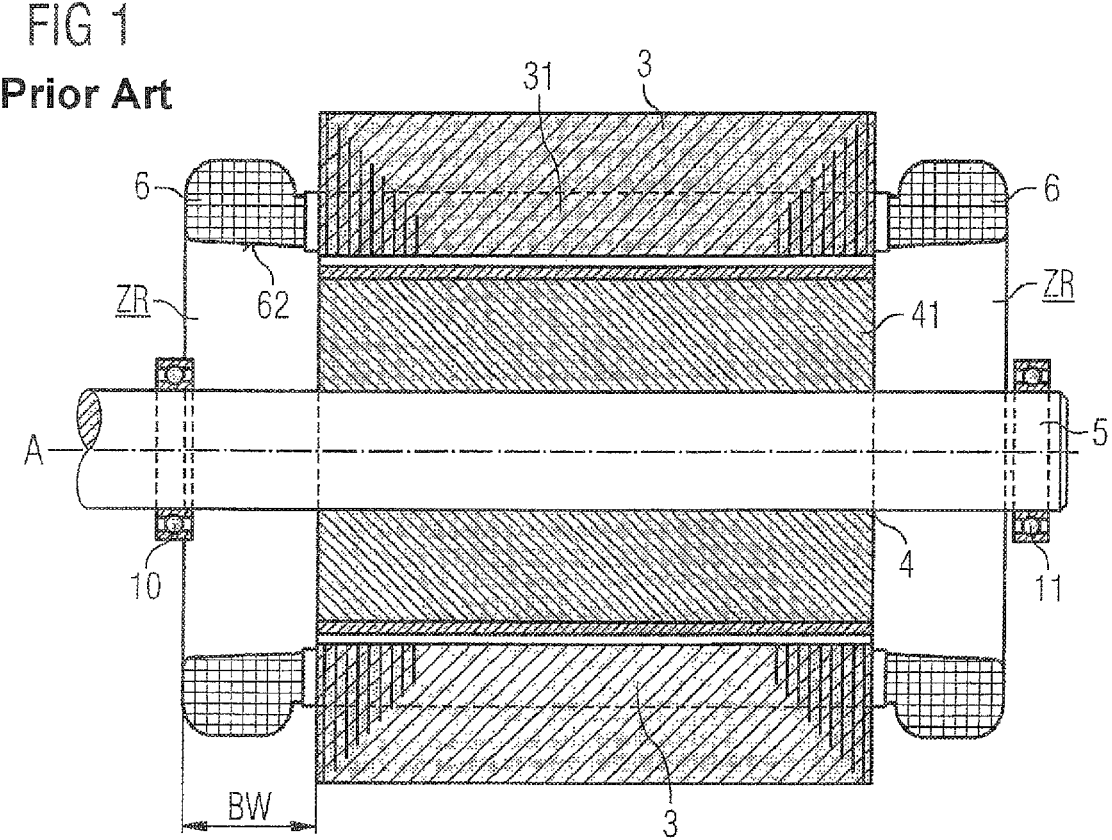
FIG. 1 shows a longitudinal section through an electrical machine according to the prior art, in the form of a highly simplified illustration.

FIG. 1 shows a longitudinal section through an electrical machine according to the prior art, along its rotation axis A and in the form of a highly simplified illustration. The electrical machine has a stator 3 and a rotor 4 which is mounted around the rotation axis A. The rotor 4 has a rotor shaft 5 which is mounted in two roller bearings 10, 11. The stator 3 has a stator core 31 with a coil winding in order to produce a rotating magnetic field. The end windings 6 of the coil winding project at both axial ends of the stator core 31. An intermediate space ZR, which does not contribute to the motor drive of the electrical machine, is formed in the axial area BW of the projecting end windings 6. The intermediate space ZR is located in the axial area between a projecting end winding 6 and the rotor shaft 5. In the radial direction, that is to say in the direction to and away from the rotation axis A, the intermediate space ZR is bounded by a radial inner face 62 of an end winding 6 and by an outer face of the rotor shaft 5.

Figure 2:
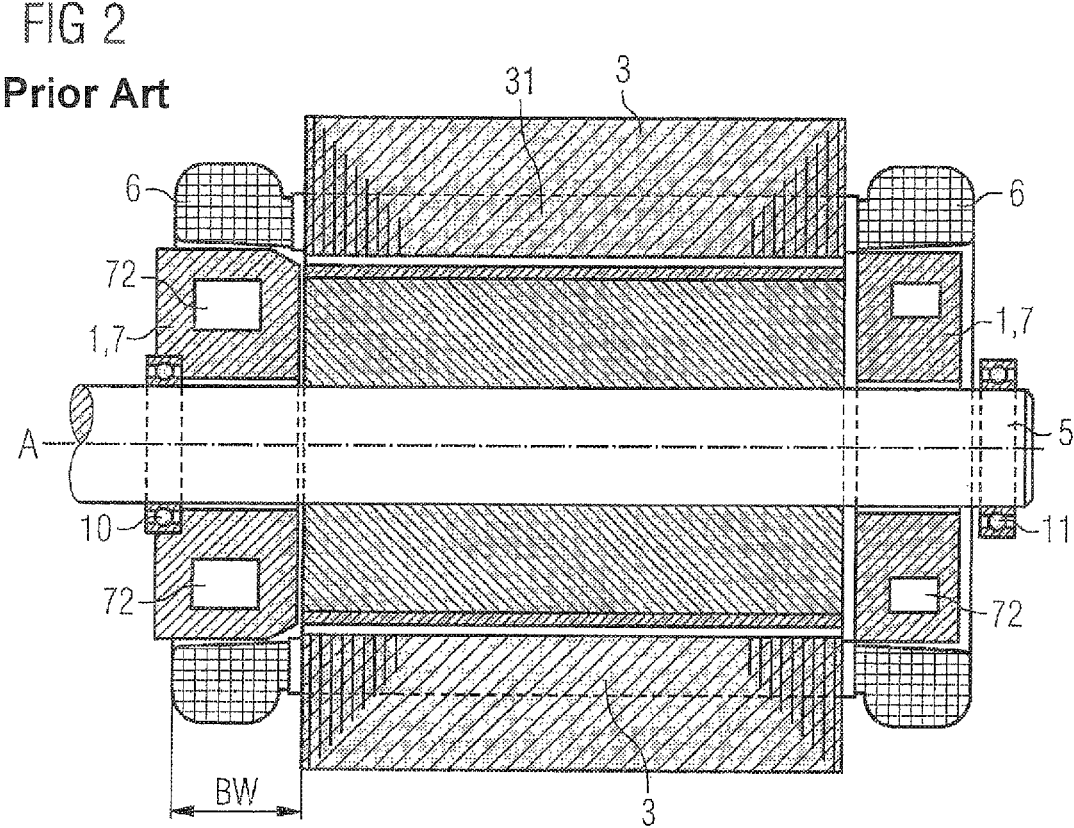
FIG. 2 shows a longitudinal section through the electrical machine as shown in FIG. 1 with a cooling device according to the invention with, for example, two coolable cap rings, in the form of a highly simplified outline illustration.

FIG. 2 shows a longitudinal section through the electrical machine shown in FIG. 1 with a cooling device 1 according to the invention, for example with two coolable cap rings 7, in the form of a highly simplified outline illustration. The electrical machine once again has a stator 3 with a stator core 31, as well as a rotor 4 with a rotor core 41 which is seated on a rotor shaft 5. A coil winding with axially projecting end windings 6 is installed in the stator core 31. The electrical machine may be an electric motor, for example an asynchronous motor or a synchronous motor. The electrical machine may alternatively be a generator. The coolable cap rings 7 may, for example, be attached to a machine housing, which is not illustrated in any more detail, or to the stator 3 of the electrical machine.

According to the invention, a coolable cap ring 7 is arranged or fitted in one of the two intermediate spaces ZR. The rotor shaft 5 is passed through the coolable cap rings 7.

Instead of two coolable cap rings 7, the cooling device 1 according to the invention may alternatively have only one coolable cap ring 7.

In the example in FIG. 2, each coolable cap ring 7 occupies at least a part of an annular intermediate space ZR which is located in an axial area BW of a projecting end winding 6 and of the rotor shaft 5. The coolable cap ring 7 which is shown in the left-hand part of FIG. 2 occupies the entire left-hand intermediate space ZR and furthermore, extends in the axial direction (that is to say in the direction of the rotation axis) to the left, that is to say in the direction of the rotor shaft end. The coolable cap ring 7 which is shown in the right-hand part of FIG. 2 is, in contrast, accommodated completely in the right-hand intermediate space ZR.

The major advantage is that the coolable cap ring 7 makes it possible to effectively dissipate the heat losses produced at the particular hot points of the end winding 6 and rotor shaft 5.

As shown in FIG. 2, each coolable cap ring 7 forms at least one cavity 72 for a coolant flowing through it, in particular for a gaseous or liquid coolant. It is also possible for only one of the coolable cap rings 7 to have a cavity 72 such as this. The gaseous medium is preferably air or compressed air. The liquid coolant is preferably water. The cavity 72 is preferably annular. A coolable cap ring 7 may, however, also have a plurality of cooling chambers instead of one annular cavity 72, and in particular may have cooling chambers in the form of segments, which are formed separately for a coolant flowing through.

The cavity 72 results in a uniform cooling performance along the radial outer circumference of the coolable cap ring 7. This improves the cooling of the end winding 6 and of the rotor shaft 5.

Figure 3:
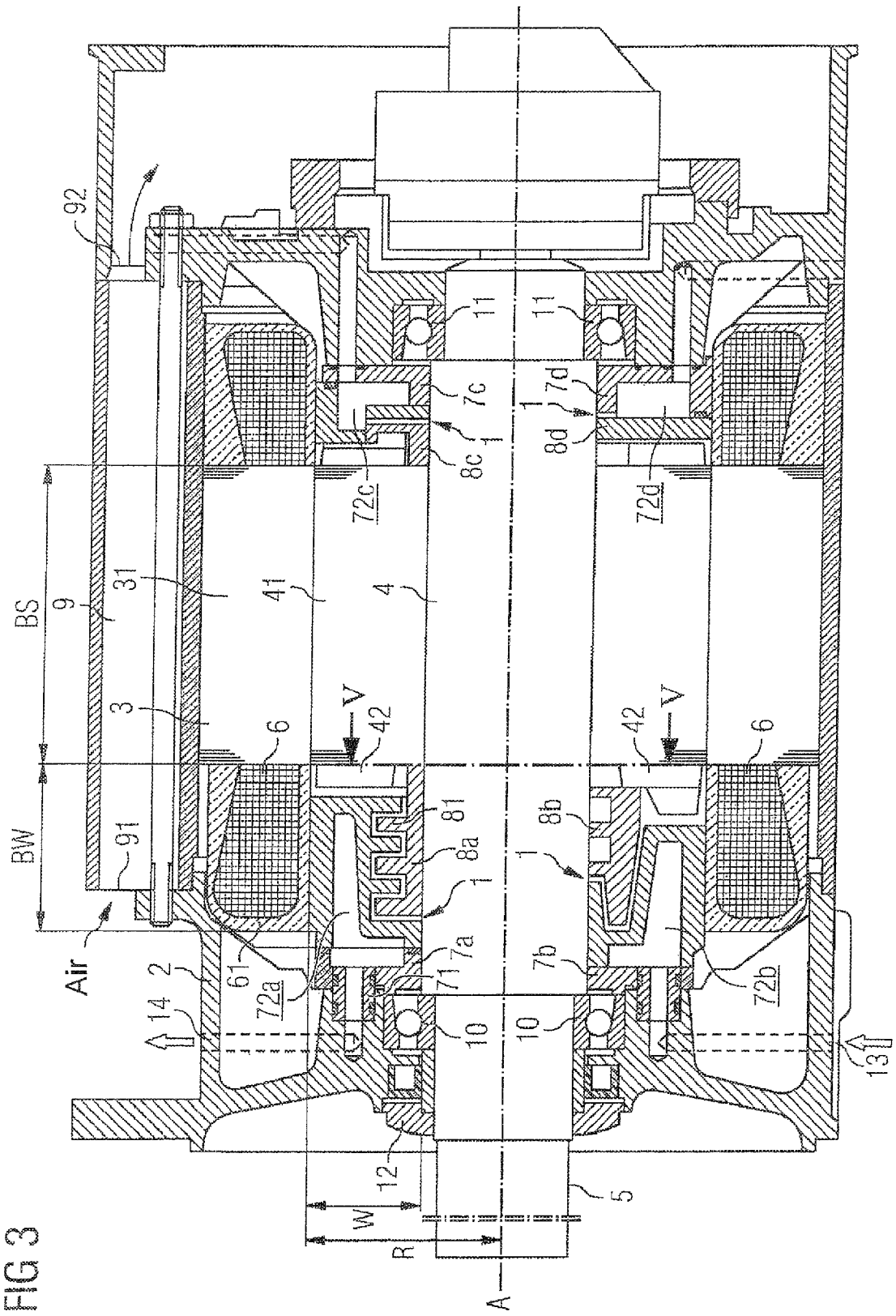
FIG. 3 shows, by way of example, a longitudinal section through a further electrical machine along its rotation axis, with a cooling device according to the invention, in the form of a design illustration.

By way of example, FIG. 3 shows a longitudinal section through a further electrical machine along its rotation axis A with a cooling device 1 according to the invention, in the form of a design illustration.

The cooling device 1 shown in FIG. 3 is used to cool the electrical machine, in particular to cool at least one end winding 6 and/or the rotor shaft 5 in the axial area BW of the at least one end winding 6.

The illustrated electrical machine 1 is an asynchronous motor. The rotor 4 of the illustrated electrical machine 1 has a rotor shaft 5 and a rotor core 41 which is seated thereon such that they rotate together. The rotor core 41 and the stator core 31 are normally laminated, in order to reduce eddy current losses. The laminated rotor core 41 is held together by means of a fastening 42. The stator core 31 and rotor core 41 respectively have an axial stator/rotor width BS which is at least approximately the same as magnetic active parts of the electrical machine. A coil winding with axially projecting end windings 6 is incorporated in the stator core 31. The rotor shaft 5 is mounted by means of roller bearings 10, 11 in the machine housing 2 such that it can rotate, and is at the same time fixed axially. The axial fixing is achieved inter alia by means of an end frame 12, which is passed over the illustrated left-hand end of the rotor shaft 5, and is screwed to the machine housing 2.

The electrical machine is cooled via a cooling air channel 9 in the form of a cooling jacket which surrounds the stator 3 of the electrical machine. The reference symbol 91 denotes the cooling air inlet opening, and the reference symbol 92 the cooling air outlet opening of the cooling jacket 9. The cooling air flow may, for example, be provided by an axial fan which is seated on the right-hand end of the rotor shaft 5. The axial fan is not illustrated in FIG. 3, for clarity reasons. As FIG. 3 also shows, the radial outer face of the end windings 6 as well as the rotor core 31 are cooled via the cooling jacket 9. In order to improve the heat transfer, the end windings 6 are surrounded by an encapsulation compound 61, which rests directly on the cooling jacket 9.

In the example shown in FIG. 3, the right-hand part, the left-hand part and the upper and lower halves show, overall, four coolable cap rings 7a-7d of physically different design. According to one embodiment of the invention, the cooling devices 1 already have hollow-cylindrical cooling elements 8a-8d which, for example, are of physically different designs. Only one half of the coolable cap rings 7a-7d and of the hollow-cylindrical cooling elements 8a-8d is in each case illustrated, in the form of a section through the rotation axis A of the electrical machine 1. The rotation axis A corresponds to the axis of symmetry of the four cap rings 7 used as examples as well as the four associated hollow-cylindrical cooling elements 8a-8d used as examples.

In the example in FIG. 3, a coolable cap ring 7a is shown in the left-hand upper part and partially co-axially radially surrounds a hollow-cylindrical cooling element 8a, which is in the form of ribs, by mutual interleaving.

In the left-hand lower part of FIG. 3, the coolable cap ring 7b used in the example is conical in the co-axial part. The associated hollow-cylindrical cooling element 8b has a conical radial outer surface which corresponds to the radial inner surface of the co-axial part of the coolable cap ring 7b.

The right-hand upper part of FIG. 3 shows a further coolable cap ring 8c which comprises annular elements with a rectangular cross section. The associated exemplary hollow-cylindrical cooling element 8c comprises a ring with a cross section in the form of a limb.

By way of example, the right-hand lower part of FIG. 3 shows a further coolable cap ring 8d, which comprises annular elements with a cross section which is rectangular and in the form of limbs. The elements are designed such that, when the coolable cap ring 7d is in the assembled state, they form a cavity 72d with a rectangular cross section. The associated hollow-cylindrical cooling element 8d is, for example, an annular disk.

In order to understand the invention, only that coolable cap ring 7a which is illustrated in the left-hand upper part of FIG. 3 as well as the associated hollow-cylindrical cooling element 8a will be described. The four coolable cap rings 7a-7d can be arranged, in a corresponding design adaptation, both in the left-hand and in the right-hand intermediate space between the respective projecting end winding 6 and the rotor shaft 5.

The coolable cap ring 7a has an annular cavity 72a for a coolant flowing through, such as air or water. Furthermore, the coolable cap ring 7 according to the invention has coolant connections 71 for the coolant inlets and outlets. The coolant connections 71 are preferably arranged on an axial outer face of the cap ring 7 and radially opposite one another. The coolant therefore flows through the entire annular cavity 72a. When the cooling device 1 is in the installed state, the coolant connections 71 are connected to cooling bores which are incorporated in the machine housing 2 and extend to the outer face of the electrical machine. External connections 13, 14 are preferably provided on the outer face of the electrical machine. The coolable cap ring 7 can be connected via the connections 13, 14 to an external recooling device or to an already existing recooling system for the electrical machine.

The coolant connections 71 are preferably passed to the outside face of the electrical machine by means of cooling tubes, cooling hoses or cooling bores which are incorporated in the machine housing 2.

The coolable cap ring 7 shown in FIG. 3 has, at least in places, an internal diameter which is slightly larger than the external diameter of the rotor shaft 5 in the area in which the latter passes through. A narrow air gap remains between the coolable cap ring 7 and the rotor shaft 5, via which at least some of the heat losses which are radiated from the rotor shaft 5 can be absorbed by the radial inner face of the coolable cap ring 7, and can be dissipated at the exterior.

It is advantageous for a liquid or grease-like substance to be introduced into this narrow air gap. The substance is distributed by capillary action uniformly in the air gap. This results in a considerably lower heat transfer resistance, in comparison to the free air gap, between the radial outer face of the rotor shaft 5 and the radial inner face of the cap ring 7a.

Figure 4:
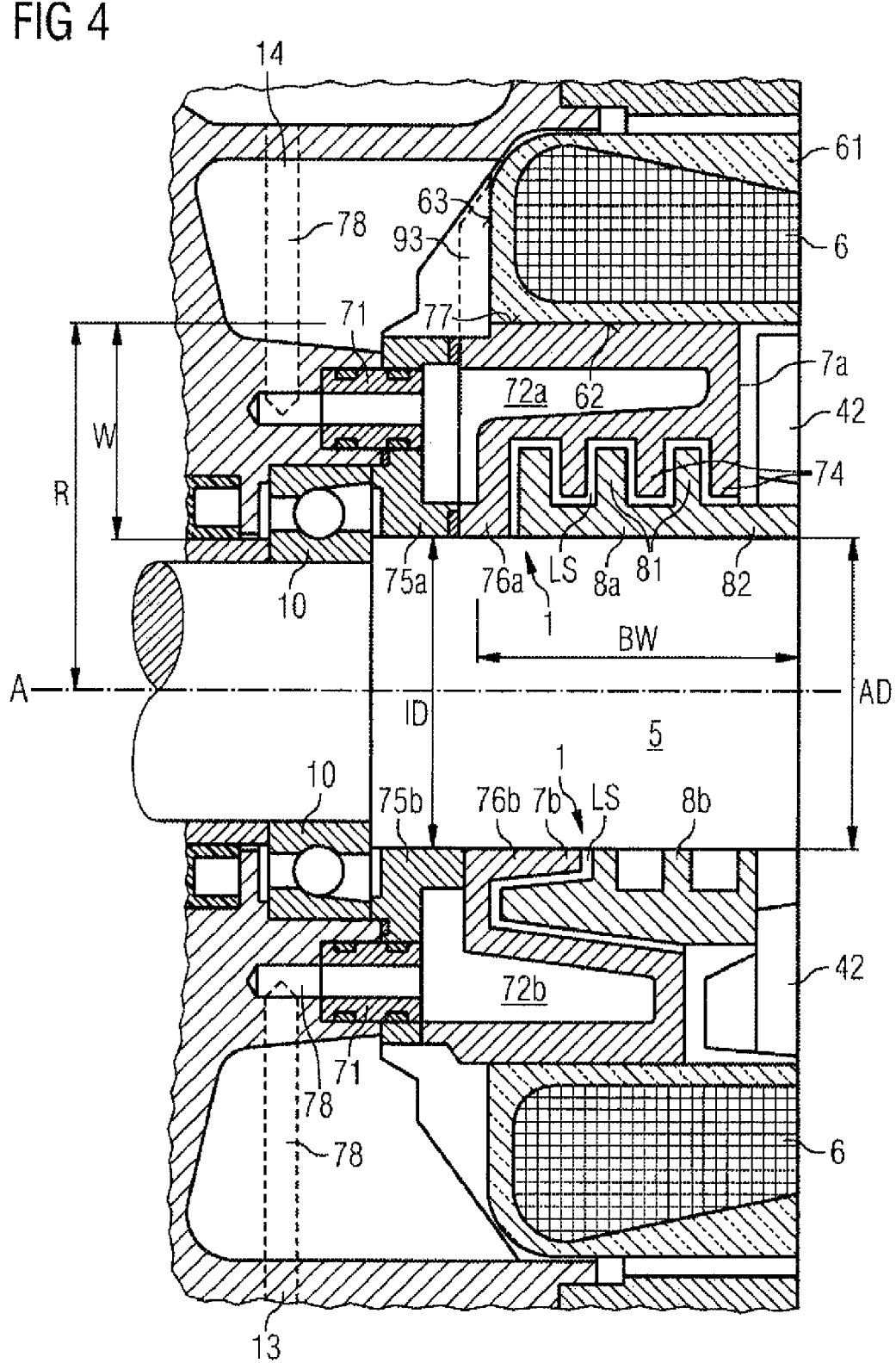
FIG. 4 shows a longitudinal section through the electrical machine as shown in FIG. 3, with the cooling device according to the invention, in the form of an enlarged illustration.

FIG. 4 shows a longitudinal section through the electrical machine as shown in FIG. 3, with the coolable cap ring 7a and the hollow-cylindrical cooling element 8a, in the form of an enlarged illustration.

According to one embodiment, the coolable cap ring 7 has a radial outer surface 77 which is geometrically matched to a radial inner surface 62 of the end winding 6. When the coolable cap ring 7a is in the installed state, the two surfaces 77, 62 rest on one another. In particular, the two surfaces 77, 62 rest on one another preferably closely and without any clearance. In order to improve the heat transfer, a highly thermally conductive means, for example, a thermally conductive strip, or a highly thermally conductive substance, such as a thermally conductive silicone or thermally conductive paste, can be introduced between the two radial surfaces 77, 82.

The external diameter of the coolable cap ring 7a does not increase in the axial direction toward the rotor core 41. In a corresponding manner, the internal diameter of the radial inner surface 77 of the end winding 6 does not decrease in the axial direction toward the rotor core 41. The radial inner surface 62 of the end winding 6 is preferably designed to be flat, for good heat transfer.

According to the invention, the cooling device 1 has at least one hollow-cylindrical cooling element 8a which is firmly seated on the rotor shaft 5 and has a rotor shaft sleeve 82 with first axially separated radial projections 81. The hollow-cylindrical cooling element 8a surrounds at least a part of the annular intermediate space, which is located in the axial area BW between the projecting end winding 6 and the rotor shaft 5. The coolable cap ring 7a has second axially separated radial projections 74 which, in the installed state, engage without touching in the intermediate areas which are formed by the first radial projections 81.

As is shown in FIG. 4, the second radial projections 74 of the coolable cap ring engage radially from the outside in the intermediate areas which are formed by the first radial projections 81. As a result of the mutual interleaving of the first and second radial projections 81, 74, the heat transfer from the hollow-cylindrical cooling element 8a to the corresponding coolable cap ring 7a is particularly good.

The first and second radial projections 81, 74 are geometrically matched to one another such that when the coolable cap ring 7 is in the installed state, they engage in the respective intermediate areas between the first and second radial projections 81, 74, maintaining a predeterminable air gap LS. The first and second radial projections 81, 74 may, for example, run in the form of rays. They may be separated, when seen in the tangential direction (that is to say around the rotation axis A).

In the example in FIG. 4, there is a uniform air gap LS after assembly of the cooling device. The width of the air gap LS may be determined and defined during the course of design of the cooling device 1. The air gap LS is preferably in a range of from 0.5 mm to 5 mm, for example 1 mm. Values going beyond this in the two-digit millimetric range are possible, particularly in the case of large machines or in the case of machines with a large amount of possibly technically dependent axial play of the rotor shaft 5.

The cap ring 7a is axially mounted in front of the hollow-cylindrical cooling element 8a in the area of the smallest internal diameter ID of the cap ring 7a. The area of the cap ring 7a in front of this projects partially into the axial area BW between the rotor shaft 5 and the radial inner face 62 of the end winding 6. As is shown in FIG. 4, the first and second radial projections 81, 74 are preferably in the form of ribs. The embodiment in the form of cooling ribs is known from the cooling of electrical components.

According to the example shown in FIG. 4, the axial area of the coolable cap ring 7a with the larger internal diameter has the second radial projections 74. The second radial projections 74 are geometrically matched to the first radial projections 81 of the hollow-cylindrical cooling element 8a and in consequence are radially circular. In this case, the second radial projections 74 in the axial area of the coolable cap ring 7 with the larger internal diameter engage co-axially and radially from the outside in the intermediate areas which are formed by the first radial projections 81. The non-touching mutual interleaving of the radial projections 81, 74 takes place in this case while maintaining the same air gap LS.

The first radial projections 81 are in the form of axially separated annular disks which are seated on the rotor shaft sleeve 82. In the example shown in FIG. 4, the projections 81 are cooling ribs in the form of disks, with the three illustrated radial projections 81 having a uniform maximum external diameter and a uniform identical radial cooling rib depth. The number of first radial projections 81 can in principle be chosen freely. A number in a range from 2 to 20 is preferable. The external diameter of the first radial projections 81 may also be different. For example, the external diameter may increase continuously in the axial direction. The distance between the first radial projections 81 may also be different. This also applies to the respective thickness of the first radial projections 81. Uniform dimensions are preferable from the design point of view.

The non-touching mutual interleaving means that the heat losses which are radiated from the large surface area of the hollow-cylindrical cooling element 8a are absorbed by an inner surface, which is comparatively of the same size, of the coolable cap ring 7a in order to cool the rotor shaft 5. The coolable cap ring 7a and the hollow-cylindrical cooling element 8a are preferably produced from aluminum, copper, brass or a cast iron. Aluminum with a black-anodized surface is particularly suitable for use as the material. A material such as this has a high radiated heat emission and heat absorption capability, a high thermal conductivity and a low relative density in comparison to the other metals mentioned above.

According to one embodiment, the coolable cap ring 7a has two cap ring components 75a, 76a which form at least one cavity 72a for the coolant when the cap ring 7a is assembled axially. The line illustrated in the cavity 72a illustrates the design section line through the cap ring 7a at right angles to the axis of symmetry and rotation A of the coolable cap ring 7a. The section line is preferably at an axial position at which the cavity 72A in the coolable cap ring 7a has its largest cross-sectional area. Particularly when using a metal casting process, this considerably simplifies the production of a coolable cap ring 7a such as this. O-rings, which are not referred to in any more detail, are shown between the two cap ring components 75, 76 for sealing purposes, in particular in the case of liquid cooling. The design section can also be provided at a radial position at which the cavity 72a has its largest cross-sectional area. In this case, the coolable cap ring 7a comprises two mutually co-axial components.

The cooling device 1 of the illustrated electrical machine has at least one coolable cap ring 7a, 7b with a radial outer surface 77. The end winding 6 is at least partially surrounded by a thermally conductive and solidified encapsulation compound 61. During solidification, the encapsulation compound 61 forms a radial inner surface 62 which is geometrically matched to the radial outer surface 77 of the coolable cap ring 7a, 7b.

Polymers or else synthetic resins, such as epoxy resin, may be used as the encapsulation compound.

The radial outer surface 77 and the radial inner surface 62 rest on one another when the cooling device and/or the coolable cap ring 7a, 7b are in the installed state. In particular, the two radial surfaces 77, 62 rest on one another closely and without any clearance. In order to improve the cooling effect further, a thermally conductive substance, for example a thermally conductive paste, can be introduced or applied between the two surfaces 77, 62. A metallic thermally conductive strip, for example composed of a metal mesh, may also be introduced between the two surfaces 77, 62.

The end windings 6 and possibly a portion of the current windings in the stator core 31 are preferably surrounded on the radial outer face and on the radial inner face 62 by the encapsulation compound 61. This allows the end windings 6 and the current windings to be effectively cooled via the cooling jacket 9 which is in contact with them and via the coolable cap ring 7a, 7b. This considerably reduces the creation of possible hot spots.

Alternatively or in combination with the previous embodiment, the cooling device 1 may have at least one coolable cap ring 7a with a radial outer surface 77. At least a part of the end winding 6 is then impregnated in a plastic. On solidification, the plastic forms a radial inner surface 62 which is geometrically matched to the radial outer surface 77 of the cap ring 7a. The radial outer surface 77 and the radial inner surface 62 rest on one another when the cooling device 1 and/or the coolable cap ring 7a are/is in the installed state.

In contrast to the previous embodiment, in which at least a portion of the end winding 6 is surrounded by the encapsulation compound 61, at least a portion of the end winding 6 is impregnated in a plastic. When in the liquid state, in which it is not yet solidified, this plastic passes through the end winding 6 and possibly parts of the current windings, or else the entire current winding. By way of example, the impregnation process can be carried out using a vacuum process which is known from the manufacturing technology for electric motors. The penetration of the end windings 6 and of the current winding with the plastic reduces the thermal resistance to the cooling radial outer surface and inner surface of the end winding 6, to a considerable extent.

By way of example, thermally conductive epoxy resin of the Hysol 9496 AB type from the LOCTITE company can be used as a plastic. This plastic is a two-component black epoxy-resin adhesive which can be cast, has little shrinkage and cures at room temperature. The plastic has a high thermal conductivity of 1.7 W/mK.

The illustrated coolable cap ring 7a according to one embodiment has a rotationally symmetrical outer surface 77, for example a cylindrical or conical outer surface 77. Furthermore, the encapsulation compound 61 or the plastic in which at least a portion of the end winding 6 is impregnated has a rotationally symmetrical radial inner surface 62 which is matched to the radial outer surface 77 of the coolable cap ring 7a. In the example in the FIG., the radial outer surface 77 and the radial inner face 62 are cylindrical.

In order to allow a coolable cap ring 7a to be fitted in the axial direction into the intermediate space between the projecting end winding 6 and the rotor shaft 5, the external diameter of the cap ring 7a to be fitted should not increase in the axial direction towards the rotor core 41. In a corresponding manner, the internal diameter of the radial inner surface 77 of the end winding 6 should not decrease in the axial direction towards the rotor core 41. In these situations, a large-area contact is possible between the coolable cap ring 7a and the radial inner surface 77 of the end winding 6, for good thermal transfer.

According to one embodiment of the invention, the coolable cap ring 7 of the cooling device 1 of the electrical machine has an at least partially circumferential cooling collar 73 for possible cooling of an axial end 63 of the end winding 6 when the coolable cap ring 7 is in the installed state. The cross section through the cooling collar 73 is illustrated by dashed lines in the example in FIG. 4. As FIG. 4 also shows, the cooling collar 73 rests flush on the axial end 63 of the end winding 6. The cooling collar 73 is, in particular an integral component of the coolable cap ring 7a, that is to say the cap ring 7a and the cooling collar 73 can be manufactured, for example, in a casting. The cooling collar 73 may alternatively be a ring with a cylindrical inner envelope surface, with the ring being plugged or drawn coaxially over the cap ring 7a. In particular, the cooling collar 73 is manufactured from a metallic material, for example aluminum, copper or steel. The cooling collar 73 is preferably completely circumferential.

According to one embodiment, the at least partially circumferential cooling collar 73 of the coolable cap ring 7 forms an axial cooling surface in the from of an annular disk. The encapsulation compound 61 or the plastic in which at least a portion of the end winding 6 is impregnated has an axial outer surface 63 in the form of an annular disk. The axial outer surface 63 in the form of an annular disk is geometrically matched to the axial cooling surface, which is in the form of an annular disk, of the cooling collar 73. The axial surfaces which are in the form of annular disks rest on one another when the cooling device 1 and/or the coolable cap ring 7a are/is in the installed state. In particular, the axial surfaces and the surfaces which are in the form of annular disks preferably rest on one another closely and without any clearance.

The cooling of the axial end of the end winding 6, the cooling of the radial inner face 62 of the end winding 6 and the radial outer face of the end winding 6, which is cooled by means of the cooling jacket 7, result in the occurrence of possible hotspots in the end winding 6 being reduced to a minimum.

Figure 5:
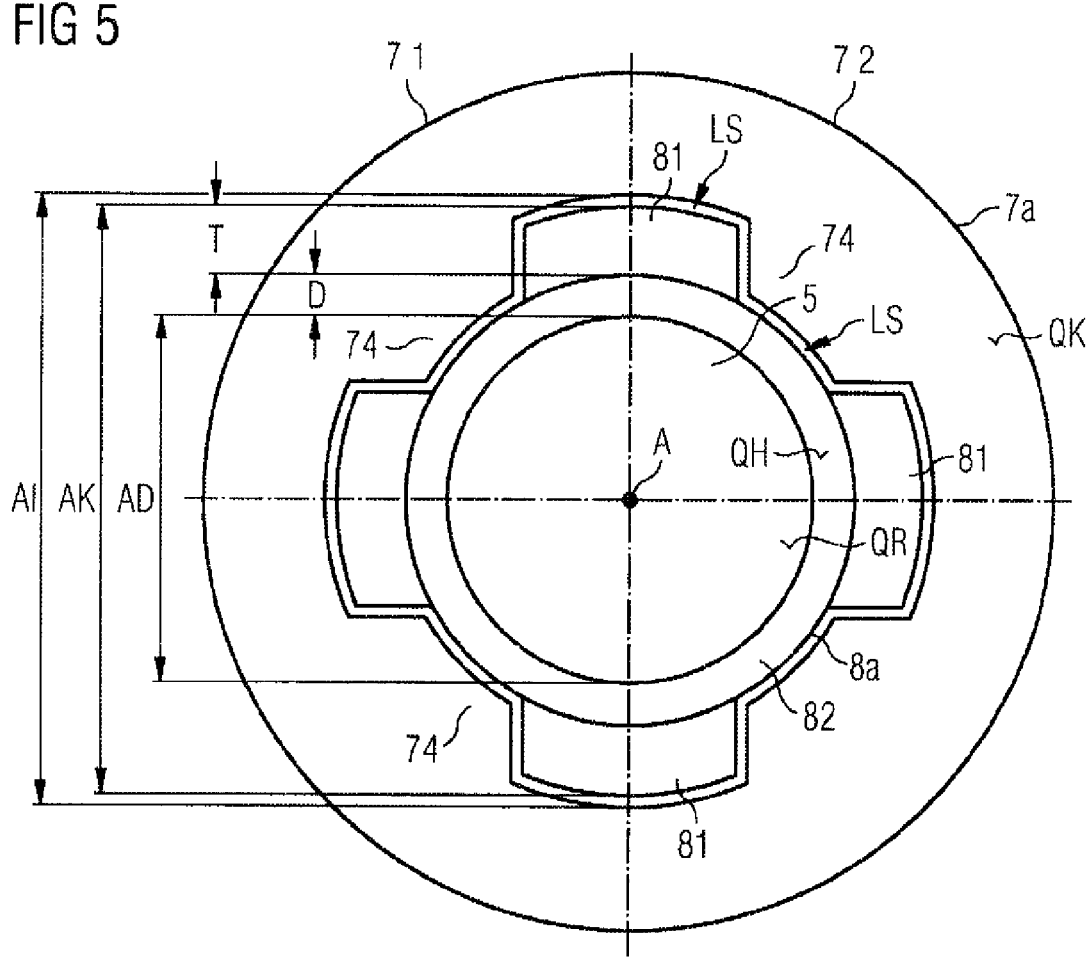
FIG. 5 shows a cross section through a coolable cap ring and through a hollow-cylindrical cooling element, which is seated on the rotor shaft, of the cooling device according to the invention along the section line V-V shown in FIG. 3.

FIG. 5 shows a cross section through a coolable cap ring 7a and through a hollow-cylindrical cooling element 8a, which is seated on the rotor shaft 5, of the cooling device according to the invention, along the section line V-V shown in FIG. 3.

For illustrative purposes, dimensions are indicated in FIG. 5. AD denotes the external diameter of the rotor shaft 5. The external diameter AD is virtually identical to the internal diameter of the hollow-cylindrical cooling element 8a and its rotor shaft sleeve 82. D denotes the thickness of the rotor shaft sleeve 82. T denotes the rib depth, that is to say the depth of the first radial projections 81 of the cooling element 8a. AI denotes the outer internal diameter of the cap ring 7a. This is slightly greater than the external diameter AK of the cooling element 8a, as a result of which an air duct LS in the millimetric range can be formed between these components 7a, 8a.

According to one embodiment, the cooling device 1 has a hollow-cylindrical cooling element 8a with a first cross-sectional area QH in the axial area of a first radial projection 81 with a central circular cutout QR. The cutout QR corresponds essentially to the cross-sectional area of the rotor shaft 5 in the axial area there. In particular, the cutout QR is slightly larger. The coolable cap ring 7a has a second cross-sectional area QK in the axial area of the second radial projections 74.

The first and second cross-sectional areas QH, QK are matched to one another such that the coolable cap ring 7a can be pushed onto the hollow-cylindrical cooling element 7a only at predetermined rotation angles with respect to one another.

In particular, the hollow-cylindrical cooling element 8a has a cruciform cross-sectional shape, as shown in FIG. 5, with a central circular cutout QR. The coolable cap ring 7a has a circular cross-sectional shape QK with a cruciform cutout which corresponds to this. Instead of the cruciform cross-sectional shape and the corresponding cutout, it is also possible to use a polygonal cross-sectional shape, for example with 5, 6 or 8 corners. In principle, any geometric configuration of the cross section of the coolable cap ring 7a is feasible. The only condition is that there is no covering when the cross-sectional area OK of the coolable cap ring 7a and the cross-sectional shape QH of the hollow-cylindrical cooling element 8a are placed one on top of the other in a centered form.

In the illustration shown in FIG. 5, the cap ring 7a and the hollow-cylindrical cooling element 8a have been rotated with respect to one another such that there is no mutual interleaving between the first and second radial projections 81, 74. The coolable cap ring 7 in the illustration shown can be pushed over the hollow-cylindrical cooling element 8 for assembly of the electrical machine 1. In contrast, if rotation through 45° were to be carried out, this would result in maximum coverage of the first and second radial projections 81, 74.

In consequence, for assembly purposes, the entire rotor 4 with the hollow-cylindrical cooling element 8 seated on the rotor shaft 5 can be pushed in through the coolable cap ring 7, which has already been mounted in the machine housing 2 and/or on the stator 3.

According to a further embodiment, the cap ring 7a has two cap ring halves 7.1, 7.2. The two cap ring halves 7.1, 7.2 are designed such that they surround the hollow-cylindrical cooling element 8a when the coolable cap ring 7a is assembled radially. The first and second radial projections 8a, 74 are mutually interleaved both axially and in a circular form after assembly. In this embodiment, the heat transfer from the cooling element 8a to the coolable cap ring 7a is particularly good.

The two cap ring halves 7.1, 7.2 can likewise be produced by means of a casting process. The two cap ring halves 7.1, 7.2 are preferably produced from aluminum, copper, brass or a metal containing cast iron.

Finally, according to a further embodiment, the electrical machine is designed such that the rotor 4 has the hollow-cylindrical cooling element 8a of the cooling device 1 with the first cross-sectional area QH in the axial area of a first radial projection 81 with the central circular cutout QR. The circular cutout QR corresponds essentially to the cross-sectional area of the rotor shaft 5 in the axial area there. The cap ring 7a has the second cross-sectional area QK in the axial area of the second radial projections 74. The first and second cross-sectional areas QH, QK are matched to one another such that the rotor 4 with the hollow-cylindrical cooling element 8a can be fitted axially at the predetermined rotation angles with respect to one another through the coolable cap ring 7a, which has already been fitted in the electrical machine.

After radial assembly of the cap ring 7a and axial insertion of the entire rotor 4 into the electrical machine, the coolable cap ring 7a coaxially surrounds the hollow-cylindrical cooling element 8a at least in an axial subarea in the intermediate space ZR between the rotor shaft 5 and the end winding 6.

This considerably simplifies the assembly of an electrical machine according to the invention such as this.

What is claimed is:

1. An electrical machine, comprising:
   a stator having a stator core having incorporated therein a coil winding with axially projecting end windings;
   a rotor having a rotor shaft which defines an axis, and a rotor core which is seated on the rotor shaft;
   at least one coolable cap ring in an axial area defined by an adjacent one of the end windings and the rotor shaft, the coolable cap ring occupying at least part of an annular intermediate space which is located in the axial area; and
   at least one hollow-cylindrical cooling element seated firmly on the rotor shaft in surrounding relationship to at least part of the annular intermediate space, the at least one cooling element has a rotor shaft sleeve with first radial projections in axial spaced-apart relationship,
   wherein the coolable cap ring has second radial projections in axial spaced-apart relationship for engagement without contact in intermediate areas defined by the first radial projections, when installed.

2. The electric machine of claim 1, constructed as a gas-cooled or liquid-cooled motor spindle or a gas-cooled or liquid-cooled built-in motor.

3. The electric machine of claim 1, wherein the cap ring is constructed for cooling at least the adjacent one of the end windings and the rotor shaft.

4. The electric machine of claim 1, wherein the coolable cap ring defines at least one cavity for a gaseous or liquid coolant flowing through.

5. The electric machine of claim 4, wherein the cavity is annular in shape.

6. The electric machine of claim 4, wherein the coolable cap ring has two cap ring components, which, when the coolable cap ring is assembled axially, form the at least one cavity for the coolant.

7. The electric machine of claim 1, wherein the coolable cap ring has two cap ring halves which surround the hollow-cylindrical cooling element, when the coolable cap ring is assembled radially.

8. The electric machine of claim 1, wherein the first and second radial projections are in the form of ribs.

9. The electric machine of claim 1, wherein the first radial projections are in the form of axially separated disk rings which are seated on the rotor shaft sleeve.

10. The electric machine of claim 1, wherein the second radial projections engage radially from outside in the intermediate areas.

11. The electric machine of claim 1, wherein the first and second radial projections are geometrically matched to one another such that, when the coolable cap ring is installed, the first and second radial projections engage in the respective intermediate areas between the first and second radial projections, maintaining a predeterminable air gap.

12. The electric machine of claim 1, wherein the coolable cap ring has a radial outer surface which is geometrically matched to a radial inner surface of the end winding and rests on the radial inner surface, when the coolable cap ring is installed.

13. The electric machine of claim 12, further comprising an encapsulation compound for at least partially surrounding the end winding, the encapsulation compound having a radial inner surface which is geometrically matched to the radial outer surface of the coolable cap ring, wherein the radial outer surface and the radial inner surface rest on one another, when the coolable cap ring is installed.

14. The electric machine of claim 12, wherein at least a part of the end winding is impregnated in a plastic, the plastic having a radial inner surface which is geometrically matched to the radial outer surface of the cap ring, wherein the radial outer surface and the radial inner surface rest on one another, when the coolable cap ring is installed.

15. The electric machine of claim 13, wherein the radial outer surface of the coolable cap ring is rotationally symmetrical, the radial inner surface of the encapsulation compound having a rotationally symmetrical configuration which is matched to the radial outer surface of the coolable cap ring.

16. The electric machine of claim 14, wherein the radial outer surface of the coolable cap ring is rotationally symmetrical, the radial inner surface of the plastic having a rotationally symmetrical which is matched to the radial outer surface of the coolable cap ring.

17. The electric machine of claim 1, wherein the coolable cap ring has an at least partially circumferential cooling collar for cooling an axial end of the end winding, when the coolable cap ring is installed.

18. The electric machine of claim 17, further comprising an encapsulation compound for at least partially surrounding the end winding, the encapsulation compound having a radial inner surface which is geometrically matched to the radial outer surface of the coolable cap ring, wherein the radial outer surface and the radial inner surface rest on one another when the coolable cap ring is installed, wherein the at least partially circumferential cooling collar has an axial cooling surface in the form of an annular disk, the encapsulation compound having an axial outer surface shaped in the form of an annular disk and geometrically matched to the axial cooling surface of the cooling collar, wherein the axial cooling surface and the axial outer surface rest on one another, when the coolable cap ring is installed.

19. The electric machine of claim 17, wherein at least a part of the end winding is impregnated in a plastic, the plastic having a radial inner surface which is geometrically matched to the radial outer surface of the coolable cap ring, wherein the radial outer surface and the radial inner surface rest on one another, when the coolable cap ring is installed, wherein the at least partially circumferential cooling collar has an axial cooling surface in the form of an annular disk, the encapsulation compound having an axial outer surface shaped in the form of an annular disk and geometrically matched to the axial cooling surface of the cooling collar, wherein the axial cooling surface and the axial outer surface rest on one another, when the coolable cap ring is installed.

20. The electric machine of claim 1, wherein the hollow-cylindrical cooling element has a first cross-sectional area in the axial area of a first radial projection and formed with a central circular cutout which essentially corresponds to a cross-sectional area of the rotor shaft in the axial area, the coolable cap ring having a second cross-sectional area in the axial area of the second radial projections, wherein the first and second cross-sectional areas are matched to one another to enable the coolable cap ring to be pushed onto the hollow-cylindrical cooling element only at a predetermined rotation angle with respect to one another.

21. The electric machine of claim 20, wherein the hollow-cylindrical cooling element has a cruciform or polygonal cross-section, and the coolable cap ring has a circular cross-sectional shape with a cruciform or polygonal cutout complementing the cross section of the hollow-cylindrical cooling element.

* * * * *